UNITED STATES PATENT OFFICE.

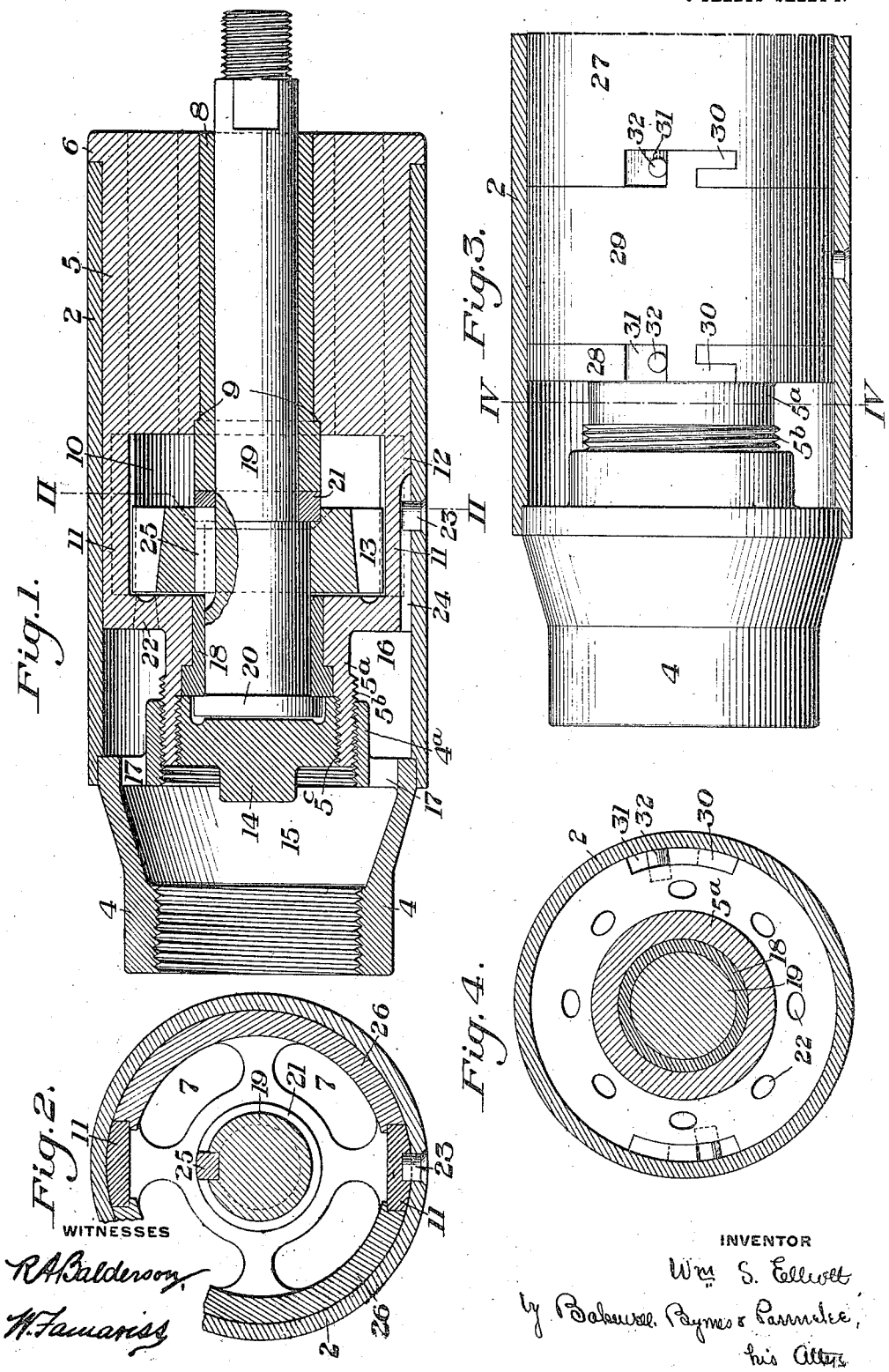

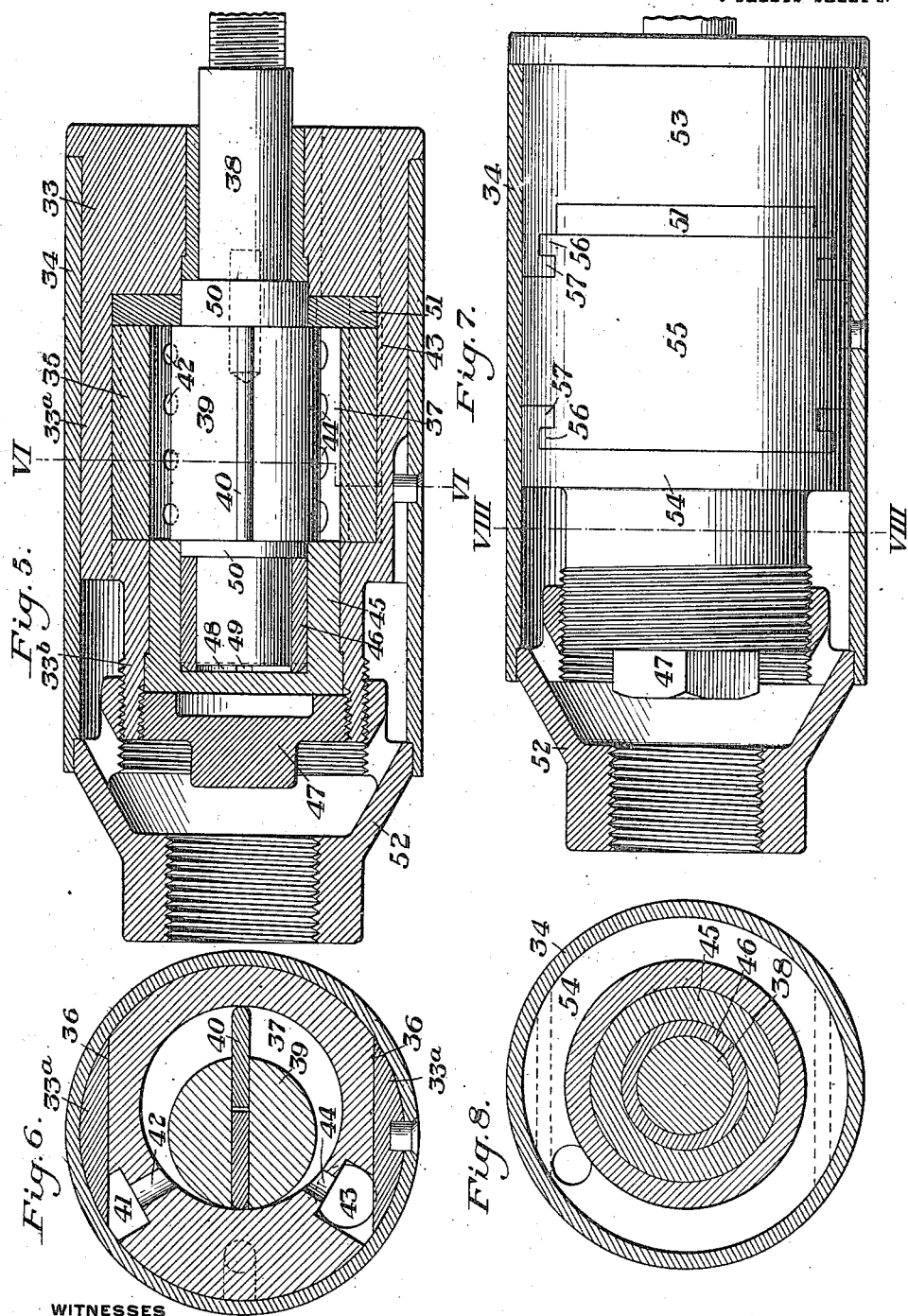

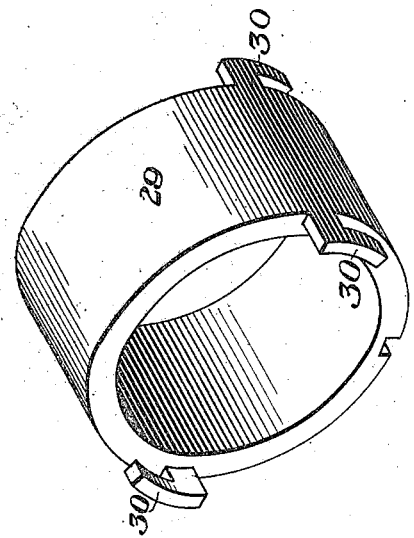
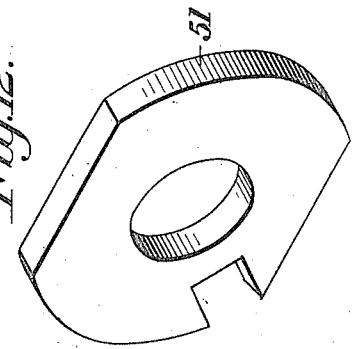
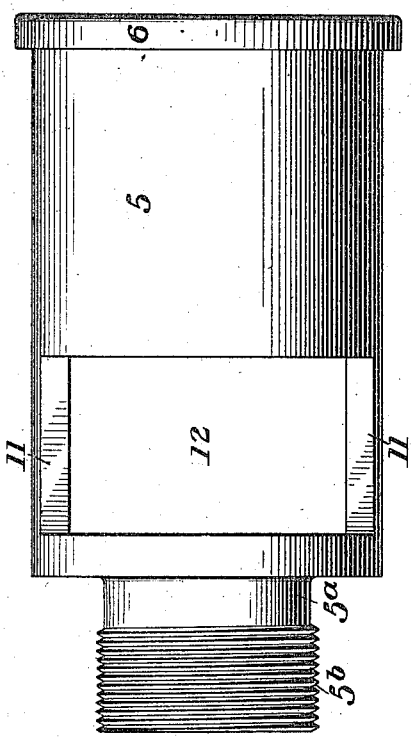
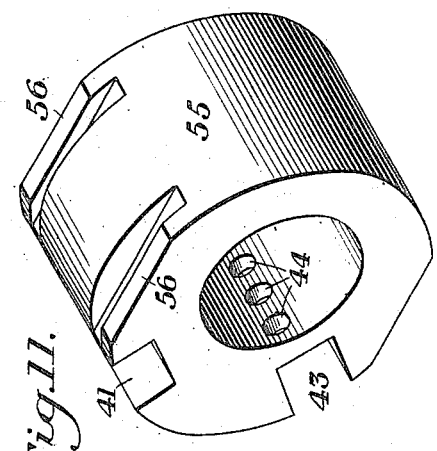

WILLIAM S. ELLIOTT, OF PITTSBURGH, PENNSYLVANIA.

MOTOR.

1,068,421.     Specification of Letters Patent.     Patented July 29, 1913.

Application filed March 20, 1911. Serial No. 615,600.

*To all whom it may concern:*

Be it known that I, WILLIAM S. ELLIOTT, of Pittsburgh, Allegheny county, Pennsylvania, have invented a new and useful Improvement in Motors, of which the following is a full, clear, and exact description, reference being had to the accompanying drawings, forming part of this specification, in which—

Figure 1 is a longitudinal section showing my invention applied to a motor of the turbine type; Fig. 2 is a section on the line II—II of Fig. 1; Fig. 3 is a side elevation with the casing in section and showing a modification; Fig. 4 is a section on the line IV—IV of Fig. 3; Fig. 5 is a longitudinal section showing my invention applied to a motor of the radially reciprocating blade type; Fig. 6 is a section on the line VI—VI of Fig. 5; Fig. 7 is a view similar to Fig. 3, but showing another modification; Fig. 8 is a section on the line VIII—VIII of Fig. 7; Fig. 9 is a side view of the cylinder forming the bearing element of Fig. 1; Fig. 10 is a perspective view of the filler and tie member of Fig. 3; Fig. 11 is a perspective view of the cylinder and tie member of Fig. 7; and Fig. 12 is a perspective view of the washer of Figs. 5 and 7.

My invention has relation to fluid pressure motors, and is designed to provide an efficient motor, in which the parts can be readily and quickly assembled and removed from the front end of the casing.

My invention is applicable both to motors of the turbine type, in which water is used as the motive power, and to motors of the radially reciprocating piston type, in which air or steam forms the motive power.

The nature of my invention will be best understood by reference to the accompanying drawings, in which I have shown several different embodiments thereof, and which will now be described, it being premised, however, that various changes can be made in the details of construction and arrangement of the several parts without departing from the spirit and scope of my invention.

Referring first to the form of motor shown in Figs. 1, 2 and 9, the numeral 2 designates an outer casing or shell, which is shown as of cylindrical form, and which is open at both ends, being preferably rabbeted interiorly at its rear end to receive the flange of the coupling member 4 for the supply pipe. 5 designates a cylinder-forming and bearing member having the flange 6 at its forward end for engagement with the front end of the casing cylinder 2. The front end portion of the member 5 is of spider form, with a plurality of longitudinal openings 7 for the free escape of the exhaust liquid, and its hub seats an elongated bushing 8 which forms the front shaft bearing. This bushing preferably has a shouldered engagement at 9 with the member 5, back of which the bushing is enlarged, such enlarged portion terminating in the piston chamber 10. The rear portion of the member 5 is connected to the front portion by the integral tie portions 11 at diametrically opposite sides, forming the opening 12, through which the turbine member 13 may be inserted in the chamber 10. The rear end portion $5^a$ of the member 5 is of reduced diameter, and is formed with an exterior thread $5^b$ for a portion of its length to receive the inner flange $4^a$ of the coupling member 4, and is also internally threaded at $5^c$ to receive an exterior thread on a plug 14. The member 4 has the admission chamber 15, which communicates with an admission chamber 16 within the motor casing by a plurality of ports 17. The rear portion $5^a$ of the member 5 seats a shouldered bushing 18, which constitutes the rear bearing for the motor shaft 19. The rear end of the shaft is provided with a thrust collar 20, which extends within the recessed inner end of the plug 14, and which has a front thrust bearing against the shouldered end of the bushing 18. A thrust member or washer 21 is interposed between the enlarged inner end of the bushing 9 and the turbine element 13. The rear wall of the chamber 10 is provided with a plurality of admission ports 22 for conducting the fluid from the chamber 16 to the turbine element. 23 is a pin seated in the outer casing 2 and adapted to engage a longitudinal groove 24 in the member 5, to prevent its rotation within the casing, said groove being open at its rear end. In assembling the parts, the turbine element is inserted through one of the openings 12 of the member 5 with its central opening in alinement with the shaft bearings, and with the key 25, which secures said element to the shaft 19 in place. The shaft 19 is then inserted through the rear end of the portion 5ᵃ of the member 5; the plug 14 is then screwed in, and the parts thus assembled are inserted into the casing 2 from the forward end thereof. The coupling member 4 is then screwed up on the threaded portion 5ᵇ to securely lock the parts in place. By unscrewing the connection at 5ᵇ, all the parts contained within the casing 2 can be removed from the forward end thereof. In order to form a complete inclosure for the chamber 10 within the member 5, I provide the fillers 26 shown in Fig. 2, and which fit between the tie portions 11. It will be noted that these tie portions 11 form tension members connecting the front and rear bearing supports; while the outer casing acts as a compression member.

In the modification shown in Figs. 3, 4 and 10, the construction is the same as that shown in Figs. 1 and 2, except that instead of forming the front bearing member 27 and the rear bearing member 28 in one piece with the tie connections 11, I employ a cylindrical tie member 29 which incloses the turbine chamber and which is formed at each end with a hooked lug or projection 30. These projections 30 are adapted to engage L-shaped recesses 31 in the front and rear bearing portions 27 and 28, and are normally held in such engagement by means of the pins 32. These pins can be loosely seated, since when the parts are assembled within the outer casing, the pins are held by the outer casing from falling out. In assembling this form of motor, the turbine wheel is placed within the cylindrical member 29, and the latter is inserted between the members 27 and 28, and held in position by the pins 32. The shaft is then inserted through the wheel in the same manner as in the construction shown in Figs. 1 and 2.

Figs. 5 and 6 illustrate the application of my invention to a motor which is adapted to be operated by steam or compressed air—preferably compressed air. In this form of my invention, the stationary bearing member 33 is generally similar to the member 5 first described. It is inserted in the outer casing 34 in the same manner as the member 5 in the case 2. The member 33 is cut away to provide openings at the sides, through which the cylinder 35, forming the piston chamber, may be inserted. This cylinder member is open at both ends, and is flattened off on two of its sides, as shown at 36 in Fig. 6, so as to fit the inner flat surfaces of the tie portions 33ᵃ of the member 33, these tie portions 33ᵃ corresponding generally to the tie portions 11 of the motor first described. The piston has an eccentrically formed piston chamber 37. 38 is the motor shaft, which is provided with bushed bearings in the front and rear portions of the member 33, and which has an enlarged piston portion 39 within the chamber 37, which carries the radially reciprocating piston blades 40. 41 is an admission port, connected with the piston chamber 37 preferably by a plurality of cross ports 42. 43 is an exhaust port connected with the piston chamber 37 preferably by the plurality of cross ports 44. The rear portion 33ᵇ of the member 33 is of sufficiently large diameter to receive therein a removable bearing seating member 45, in which the bushing 46 for the rear bearing is seated. This member 45 is secured in place by the screw plug 47, which screws into the open rear end of the rear portion 33ᵇ of the member 33. An air space 48 is provided between the rear end of the shaft 38 and the rear closed end of the member 45, and having an escape opening 49 to the atmosphere to relieve end pressure on the shaft. The shaft 38 is provided at each end of the piston portion with a thrust collar or enlargement 50. These thrust collars or enlargements bear against the inner ends of the shaft bushings, thereby effectively preventing end motion of the shaft. A wear plate or washer 51 is preferably seated around the front shoulder or enlargement 50, and between the end of the cylinder and the rear part of the member 33. The manner of assembling the parts of this motor is substantially the same as in the forms first described. The cylinder is first inserted through one of the side openings of the member 33, and the shaft is inserted endwise therethrough into its bearings. The parts are then inserted into the casing 34 from the forward end thereof, and are secured by screwing on the coupling member at 52, which is substantially the same as the coupling member 4 first described.

In the modification illustrated in Figs. 7, 8 and 11, the construction is substantially the same as in the form shown in Figs. 5 and 6, except that instead of forming the front and rear shaft bearing portions of the stationary member in one piece connected by straps, they are formed as two separate pieces 53 and 54, and are connected or tied together by means of the cylinder 55. This cylinder is formed at its ends with the hooks 56, which engage hooks 57 of complementary form on the members 53 and 54. The construction is otherwise the same as that shown in Figs. 5 and 6.

The advantages of my invention result from the manner of constructing, arranging and assembling the several parts, whereby they can be readily inserted into and removed from the front end of the motor casing or shell, and whereby any part may be quickly reached for renewal or repairs.

The specific claims to the forms of my invention shown in Figs. 3, 4, 7 and 8 are made in a divisional application Serial No. 729,075, filed November 1st, 1912.

What I claim is:—

1. A fluid pressure motor, comprising an outer shell, front and rear shaft bearings contained within the shell and removable from the front end of the shell, means whereby a motor element may be inserted intermediate the shaft bearings, and means at the rear end of the casing or shell for securing the parts within the shell; substantially as described.

2. A fluid pressure motor, comprising an outer shell, front and rear shaft bearing portions removable from the outer shell at its front end, means for inserting a motor element between the shaft bearing portions and for effecting a tie connection between said portions, and a securing member at the rear end of the shell having a securing engagement with the portion carrying the rear shaft bearing; substantially as described.

3. A fluid pressure motor, comprising an outer shell, front and rear shaft bearing portions removable from the outer shell at its front end, means for inserting a motor element between the shaft bearing portions and for effecting a tie connection between said portions, and a securing member at the rear end of the shell having a securing engagement with the portion carrying the rear shaft bearing, said securing member also constituting a coupling member for the motor supply pipe or hose; substantially as described.

4. A fluid pressure motor, comprising an outer shell, a front shaft bearing member having a flange at its forward end engaging the front end of the outer shell, a rear shaft-bearing member, a tie connection between said members, a motor element intermediate the shaft bearing portions, and removable in a direction transverse to the axis of the motor, and means for securing the shaft bearing portions within the outer shell; substantially as described.

5. A fluid pressure motor, comprising an outer shell, front and rear shaft bearing portions, a tie member connecting said portions with an intermediate motor chamber, and a motor element in said chamber which can be removed therefrom in a direction transverse to the longitudinal axis of the motor when the parts are removed from the outer shell; substantially as described.

6. A fluid pressure motor, comprising an outer shell, front and rear shaft bearing portions having a tie connection and an intermediate motor space, said shaft bearing portions being removable from the front end of the shell, a motor shaft insertible into its bearings from one end, and a motor element which can only be removed after the removal of the outer shell; substantially as described.

7. A fluid pressure motor, comprising an open-end shell, a stationary member insertible into and removable from the shell at the forward end thereof, said member having front and rear shaft bearing portions, and a connecting or tie portion containing a motor chamber, a motor element in said chamber, a motor shaft journaled in said bearings and insertible and removable therefrom at the rear of its rear bearing, means for normally securing the shaft against endwise movement, and a securing member extending into the rear end of the shell and having a securing engagement with the rear shaft bearing portion; substantially as described.

8. A fluid pressure motor, comprising an outer shell, front and rear shaft bearing portions separated by a motor space, with tie connections across said space, the rear shaft bearing portion having coupling means, a coupling member therefor, and a removable plug member having a securing engagement with the said rear shaft bearing portion; substantially as described.

9. In a fluid pressure motor, comprising an outer shell, a front shaft bearing portion having a flanged engagement with the forward end of the shell, a rear shaft bearing portion having a threaded extension, said shaft bearing portions being insertible into and removable from the shell at the front end thereof and separated from each other by a motor space or chamber, a tie connection between said portions, and a securing member engaging said extension; substantially as described.

10. In a fluid pressure motor, comprising an outer shell, a front shaft bearing portion having a flanged engagement with the forward end of the shell, a rear shaft bearing portion having a threaded extension, said shaft bearing portions being insertible into and removable from the shell at the front end thereof and separated from each other by a motor space or chamber, a tie connection between said portions, and a securing member engaging said extension, said extension being arranged to permit a motor shaft to be inserted therethrough into its bearings from the rear; substantially as described.

11. A fluid pressure motor, comprising an outer shell, front and rear shaft bearing portions removable from the front end of the shell, said portions being separated from each other by a motor space or chamber and having a tie connection, the rear shaft bearing portion having an extension of reduced diameter to form a surrounding admission chamber, and a coupling member extending into the rear end of the shell and having a securing engagement with said extension; substantially as described.

12. A fluid pressure motor, comprising an outer shell, front and rear shaft bearing portions insertible into and removable from the front end of the shell, said portions being separated from each other by a motor space or chamber and having a tie connection, the rear shaft bearing portion having an extension of reduced diameter to form a surrounding admission chamber, and a coupling member extending into the rear end of the shell and having a securing engagement with said extension, together with ports connecting the admission chamber with the motor chamber, and exhaust ports communicating with the motor chamber and extending outwardly through the front shaft bearing portion; substantially as described.

13. A fluid pressure motor, comprising an outer shell, front and rear shaft bearing portions removable from the front end of the shell and separated by a motor space or chamber, a tie connection between said bearing portions, said tie connection being independent of the outer shell, and means for securing said shaft bearing portions within the shell and for preventing their rotation, said bearing portions being arranged to permit a motor shaft to be inserted and removed from its bearings through the rear bearing; substantially as described.

14. A fluid pressure motor, comprising an outer shell, front and rear shaft bearing portions insertible into and removable from said shell at its front end, a motor shaft removable from said portions through the rear shaft bearing, a motor element secured to said shaft between the two bearings, said shaft having a thrust engagement with its bearings to prevent endwise movement thereof, and a coupling member extending into the rear portion of the casing or shell and normally securing the shaft bearing portions against removal; substantially as described.

15. A fluid pressure motor, comprising an outer shell, front and rear shaft bearing portions insertible into and removable from said shell at its front, a motor shaft insertible and removable from said portions through the rear shaft bearing, a motor element secured to said shaft between the two bearings, said shaft having a thrust engagement with its bearings to prevent endwise movement thereof, a coupling member extending into the rear portion of the casing or shell and normally securing the shaft bearing portions against removal, and a removable member for normally preventing rearward movement of the rear shaft bearing; substantially as described.

16. In a fluid pressure motor, an outer shell, front and rear shaft bearing portions removable from the front end of the shell, and a motor element intermediate the shaft bearing portions, said portions having a tie connection; substantially as described.

17. In a fluid pressure motor, an outer shell, front and rear shaft bearing portions, removably seated in said shell, and having a tie connection inclosing a motor chamber intermediate said bearings, a motor shaft journaled in said bearings, and a motor element carried by said shaft and which can only be removed after the removal of the shaft from its bearings and the removal of the shaft bearing portions from the shell; substantially as described.

18. In a fluid pressure motor, an outer shell, front and rear shaft bearings removably seated in the shell, and having a tie connection, and means for preventing rotation of said bearing portions within the shell; substantially as described.

19. A fluid pressure motor, comprising an outer shell, front and rear bearing supports removably seated in said shell, a tie connection between said supports, and a motor shaft journaled in said supports, the rear support having an opening therethrough to permit said shaft to be inserted and removed through said opening from the rear side of said bearing, and a plug normally closing said opening; substantially as described.

20. A motor having admission and exhaust ports communicating with a motor chamber, front and rear bearing supports connected by a tension member, and a compression member outside the tension member and inclosing the tension member; substantially as described.

21. A fluid pressure motor having front and rear bearings and an intervening motor chamber, said bearings having a tie connection outside of the motor chamber, a shaft and thrust bearings, the shaft bearings and thrust bearings being removable through the rear bearing support from the rear side thereof; substantially as described.

In testimony whereof, I have hereunto set my hand.

WILLIAM S. ELLIOTT.

Witnesses:
G. M. VIERS,
H. M. CORWIN.

Copies of this patent may be obtained for five cents each, by addressing the "Commissioner of Patents, Washington, D. C."